Patented Nov. 17, 1953

2,659,754

UNITED STATES PATENT OFFICE 2,659,754

TREATMENT OF CARBOXYMETHYL DIETHERS OF ETHYLENE GLYCOLS TO REMOVE HNO₃

Arthur B. Ash, Wyandotte, and Mason H. Earing, Lincoln Park, Mich., assignors to Wyandotte Chemicals Corporation, Wyandotte, Mich., a corporation of Michigan No Drawing. Application May 22, 1952, Serial No. 289,426

5 Claims. (Cl. 260—535)

This invention relates to a method of treating carboxymethyl diethers of ethylene glycols to remove HNO₃ therefrom. More specifically, this invention relates to a method for removing nitric acid from carboxymethyl diethers of ethylene glycols by treatment with sulfur dioxide to form a chemical complex which includes a nitrogen oxide and which can be subsequently removed by physical or chemical means. The term "ethylene glycol" is used herein in a generic sense and includes within its meaning both monoethylene glycol and polyethylene glycols.

Carboxymethyl diethers of ethylene glycols have the following type formula:

(A) 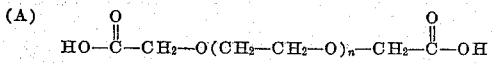

where $n$ is an integer. These compounds are a valuable class of water-soluble dibasic acids which are useful as intermediates in the preparation of water-soluble, high molecular weight, linear polymers, as intermediates in the preparation of surface active agents, as compounding ingredients in pharmaceuticals and cosmetics, as an ingredient of buffing, burnishing, grinding and cutting compounds in the metal finishing arts, and related uses.

The carboxymethyl diethers are prepared by the nitric acid oxidation of polyoxyethylene glycols as represented by the following equation:

HO(CH₂—CH₂—O)$_{n+2}$H + HNO₃ ⟶

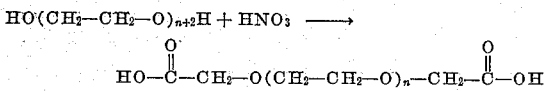

Nitric acid in excess of the stoichiometric amount is employed in the above reaction and as a result thereof the crude reaction product is a mixture of the desired carboxymethyl diether and nitric acid. The bulk of the nitric acid may be removed from such reaction mixture by vacuum distillation in a falling film evaporator as described in our copending application Serial No. 285,462, filed May 1, 1952. It has been observed, however, that the final traces (1–2%) of nitric acid cannot be removed by this distillation procedure. The exact form of the trace nitric acid is unknown, but the fact that it cannot be removed by distillation suggests that the acid forms a complex with the carboxymethyl diether or perhaps is present as a nitrate ester of the polyoxyethylene glycol starting material. In any event, the material analyzes as HNO₃ and is a highly corrosive and undesirable adulterant in the final product. Lacking more specific information as to the exact chemical nature of the compound, it will be referred to simply as nitric acid. Regardless of the exact nature or form of the nitric acid, it has been extremely difficult to remove from the desired carboxymethyl diether. Treatment of the nitric acid containing carboxymethyl diether with absorbents such as charcoal and activated clay; ion exchange resins; oxidizing agents such as hydrogen peroxide; and diverse other treating means have been unsuccessful in removing the contaminating nitric acid.

It is an object of this invention to provide a method for removing nitric acid from mixtures of this acid with carboxymethyl diethers of ethylene glycols.

Another object of the invention is to provide a method for removing nitric acid from mixtures of this acid with carboxymethyl diethers of ethylene glycols whereby the carboxymethyl diether is obtained in a high degree of purity.

Other objects and advantages of this invention will become apparent from the following detailed description thereof.

We have discovered a unique chemical process for removing nitric acid from mixtures of this acid with carboxymethyl diethers of ethylene glycols, which comprises treating the solution containing nitric acid and carboxymethyl diether with sulfur dioxide to form a chemical complex that is probably constructed from sulfur dioxide and an oxide of nitrogen. (Hereinafter, for the sake of brevity, the complex of sulfur dioxide and an oxide of nitrogen will be referred to simply as the "chemical complex.") The so-formed chemical complex may be removed or destroyed by methods which will be subsequently described.

The exact chemical nature of the sulfur dioxide complex is unknown. It is possible that the sulfur dioxide reacts directly with the nitric acid to form the complex, which may be hydrated. It is also possible that the sulfur dioxide reduces the nitric acid to lower nitrogen oxides which then react with sulfur dioxide to form a complex therewith. As used herein the term "complex" is used to designate an association of two or more molecules, whether it be by chemical reaction or physical attraction. In any event, the chemical identity of the complex is relatively unimportant since it is usually subsequently removed by vacuum distillation or destroyed by treatment with an oxidizing agent.

To prepare the chemical complex, gaseous sulfur dioxide is dissolved in the carboxymethyl diether which contains nitric acid and the resulting solution is heated. In preparing the chemical complex, it is not essential to control the quantity of sulfur dioxide employed and ordinarily the carboxymethyl diether solution is simply saturated therewith at room temperature. Temperature is only important in its effect upon the reaction rate. Satisfactory rates are generally obtained at treating temperatures as low as 40–50° C. and little advantage is obtained by heating much above 100° C. At a temperature of 60° C., the reaction is completed in less than 1.5 hours.

The formation of the complex converts the nitric acid to an innocuous form which need not be removed from the carboxymethyl diether. However, the complex can be easily removed from the diether and this is usually preferred. The complex is more volatile than the carboxymethyl diether and as a result can be removed by vacuum distillation. Alternatively, the complex can be destroyed by treatment with a strong oxidizing agent such as hydrogen peroxide. It is possible that the oxidizing agent converts sulfur dioxide to sulfur trioxide which does not form a complex with the nitrogen oxide. While essentially any oxidizing agent that will convert sulfur dioxide to sulfur trioxide can be used to destroy the complex, it is preferred to use hydrogen peroxide in this step since no additional contaminates are introduced into the carboxymethyl diether by this agent.

The following examples are set forth to more clearly illustrate the principle and practice of this invention to those skilled in the art.

Example 1.—Part A

One hundred and eighty-six grams of a carboxymethyl diether of a polyoxyethylene glycol having a molecular weight of 228, i. e. where $n$ in Formula A has an average value of 2.2, and containing 1.8% nitric acid was charged into a three-neck round bottom flask equipped with a gas inlet, a stirrer, and a gas outlet. The solution was heated to 50–60° C. and sulfur dioxide was bubbled through the solution over a period of 1 hour with stirring. At this point, the formation of the complex was complete.

Example 1.—Part B

The apparatus of Part A was modified in that the gas outlet was attached to a water aspirator and the gas inlet was attached to a source of carbon dioxide. In addition a bleed valve was placed in the line connecting the gas inlet to the source of carbon dioxide. The pressure within the flask was reduced to 25–30 mm. of Hg by means of the water aspirator and the bleed valve in the gas inlet was adjusted so that a small quantity of carbon dioxide was bubbled through the carboxymethyl diether. The temperature was set at 60° C. and the solution was maintained under these conditions for 1.5 hours. At the end of this treatment, the carboxymethyl diether contained less than 0.001% nitric acid.

Example 2.—Part A

Fifty-two grams of a carboxymethyl diether of a polyoxyethylene glycol having a molecular weight of 228, i. e. wherein $n$ in Formula A has an average value of 2.2, and containing 2.2% nitric acid was charged into the apparatus described in Example 1, Part A, and saturated with sulfur dioxide at room temperature. The temperature was set at 100° C. and sulfur dioxide was bubbled through the solution for 1.5 hours with stirring. Thereafter the addition of sulfur dioxide was stopped, but the solution was heated with stirring for an additional 1.5 hours.

Example 2.—Part B

The apparatus of Part A was modified in that the gas outlet was replaced with a water condenser and the gas inlet was sealed. Five milliliters of 30% hydrogen peroxide was added to the carboxymethyl diether and the resulting solution was heated for 6.5 hours at 100° C. The resulting product contained 0.03% nitric acid.

In preparing the sulfur dioxide-nitrogen oxide complex, sulfur dioxide may be introduced in the carboxymethyl diether solution in any convenient manner. Because of the ease with which it can be introduced into the solution, and because it introduces no further adulterants in the carboxymethyl diether solution, it is preferred to form the complex by adding gaseous sulfur dioxide to the solution. If it should be desired, however, sulfur dioxide may be prepared in situ to form the chemical complex. For example, a salt which releases sulfur dioxide upon mild heating may be introduced into the carboxymethyl diether solution and, when the solution is heated, it will release its sulfur dioxide content to form the chemical complex. Alternatively, the carboxymethyl diether may be saturated with hydrogen sulfide and subsequently treated with a strong oxidizing agent such as hydrogen peroxide to form $SO_2$ which then reacts further to form the desired complex. The method of forming $SO_2$ in situ from hydrogen sulfide is illustrated in Example 3.

Example 3.—Part A

Forty-nine grams of a carboxymethyl diether of a polyoxyethylene glycol having a molecular weight of 228, i. e. where $n$ in Formula A has an average value of 2.2, and containing 0.74% nitric acid, and 49 grams of water were charged into a three-neck round bottom flask equipped with a stirrer, a gas inlet tube and a reflux condenser. The solution was heated to 50° C. and hydrogen sulfide was bubbled therethrough for 1.5 hours. The water and excess hydrogen sulfide were then removed by vacuum distillation. Thereafter, 50 ml. of water was added to the product and it was refluxed for 15 minutes to coagulate colloidal sulfur that was present, and the solution was then filtered using a diatomaceous earth filter aid.

Example 3.—Part B

Three milliliters of 30% hydrogen peroxide was added to the product of Part A and the solution was refluxed for one hour. After this treatment, the product contained less than 0.01% nitric acid.

What is claimed is:

1. A method for treating a mixture consisting essentially of a carboxymethyl diether of an ethylene glycol having the type formula:

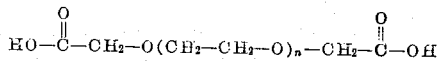

where $n$ is an integer, and nitric acid, which comprises intimately contacting said mixture with sulfur dioxide and heating to form a complex of an oxide of nitrogen and sulfur dioxide.

2. A method for treating a mixture consisting essentially of a carboxymethyl diether of an ethylene glycol having the type formula:

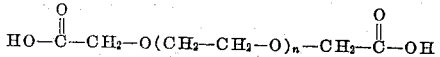

where $n$ is an integer, and nitric acid, which comprises intimately contacting said mixture with sulfur dioxide, heating to form a complex of an oxide of nitrogen and sulfur dioxide, and subsequently removing the complex.

3. A method for treating a mixture consisting essentially of a carboxymethyl diether of an ethylene glycol having the type formula:

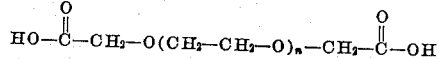

where $n$ is an integer, and nitric acid, which comprises intimately contacting said mixture with sulfur dioxide, heating to form a complex of an oxide of nitrogen and sulfur dioxide, and subsequently removing the complex by vacuum distillation.

4. A method for treating a mixture consisting essentially of a carboxymethyl diether of an ethylene glycol having the type formula:

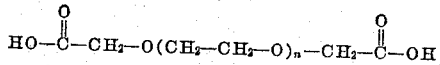

where $n$ is an integer, and nitric acid, which comprises intimately contacting said mixture with sulfur dioxide, heating to form a complex of an oxide of nitrogen and sulfur dioxide, and subsequently adding a strong oxidizing agent to destroy the complex.

5. The method of claim 4 where the oxidizing agent is hydrogen peroxide.

ARTHUR B. ASH.
MASON H. EARING.

References Cited in the file of this patent
UNITED STATES PATENTS

| Number | Name | Date |
|---|---|---|
| 1,332,028 | Coblentz et al. | Feb. 24, 1920 |
| 1,401,937 | Bailey | Dec. 27, 1921 |
| 2,360,673 | Handford | Oct. 17, 1944 |